(12) United States Patent
Keigley

(10) Patent No.: US 10,492,354 B2
(45) Date of Patent: *Dec. 3, 2019

(54) SOIL WORKING MACHINES INCLUDING HEIGHT AND PITCH TOOL ADJUSTABILITY

(71) Applicant: ABI Attachments, Inc., Mishawaka, IN (US)

(72) Inventor: Kevin V. Keigley, Osceola, IN (US)

(73) Assignee: Absolute Innovations, Inc., Osceola, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/855,306

(22) Filed: Dec. 27, 2017

(65) Prior Publication Data

US 2018/0116097 A1    May 3, 2018

Related U.S. Application Data

(63) Continuation of application No. 15/075,461, filed on Mar. 21, 2016, now Pat. No. 9,883,621, which is a continuation of application No. 13/860,367, filed on Apr. 10, 2013, now Pat. No. 9,332,687.

(60) Provisional application No. 61/622,290, filed on Apr. 10, 2012.

(51) Int. Cl.
| | | |
|---|---|---|
| *A01B 63/00* | (2006.01) | |
| *A01B 63/14* | (2006.01) | |
| *A01B 63/32* | (2006.01) | |
| *A01B 19/08* | (2006.01) | |

(52) U.S. Cl.
CPC ............ *A01B 63/008* (2013.01); *A01B 19/08* (2013.01); *A01B 63/145* (2013.01); *A01B 63/32* (2013.01)

(58) Field of Classification Search
CPC ......... A01B 19/02; A01B 19/04; A01B 19/06; A01B 33/025; A01B 35/06; A01B 35/12; A01B 35/22; A01B 61/044; A01B 61/046; A01B 63/104; A01B 63/32; A01B 63/008
USPC ................. 172/261, 263–268, 497, 500, 506
See application file for complete search history.

(56) References Cited

U.S. PATENT DOCUMENTS

| | | |
|---|---|---|
| 753,452 A | 3/1904 | Van Brunt |
| 2,277,880 A | 3/1942 | Noble |
| 2,292,488 A * | 8/1942 | Stevens, Jr. .......... A01B 61/044 172/325 |
| 2,358,298 A | 9/1944 | Benjamin |

(Continued)

OTHER PUBLICATIONS

International Search Report and Written Opinion, PCT/US2013/035994, dated Jul. 25, 2013, Absolute Innovations, Inc.

*Primary Examiner* — Matthew Troutman
(74) *Attorney, Agent, or Firm* — Taft Stettinius & Hollister LLP

(57) ABSTRACT

Unique self-propelled soil working machines are disclosed. In certain exemplary embodiments the self propelled soil working machine includes a tool carrier which is actively adjustable to provide variable downward force on a soil working tool via a suspension element which is further passively responsive to accommodate motion of the tool in response to external force. In certain exemplary embodiments, the tool carrier is configured to adjust the working depth and pitch of the tool. Further embodiments, forms, objects, features, advantages, aspects, and benefits shall become apparent from the following description and figures.

19 Claims, 6 Drawing Sheets

(56) References Cited

U.S. PATENT DOCUMENTS

| | | |
|---|---|---|
| 2,683,404 A | 7/1954 | Buhr |
| 2,687,074 A | 8/1954 | Tanke et al. |
| 2,692,543 A | 10/1954 | Tanke |
| 2,705,445 A | 4/1955 | Enrico |
| 2,730,031 A | 1/1956 | Buhr |
| 2,743,655 A | 5/1956 | Rafferty |
| 2,815,704 A | 12/1957 | Slater |
| 3,004,611 A | 10/1961 | Tanke |
| 3,048,229 A | 8/1962 | Simpson |
| 3,048,981 A | 8/1962 | Hing |
| 3,101,794 A | 8/1963 | Bechman |
| 3,305,028 A | 2/1967 | Schaper |
| 4,030,428 A | 6/1977 | Truax |
| 4,077,478 A | 3/1978 | Neukom |
| 4,116,140 A | 9/1978 | Anderson et al. |
| 4,131,162 A | 12/1978 | Schmitz |
| 4,149,475 A * | 4/1979 | Bailey .................. A01C 5/06 111/140 |
| 4,149,479 A | 4/1979 | Bailey et al. |
| 4,275,670 A | 6/1981 | Dreyer |
| 4,311,104 A | 1/1982 | Steilen |
| 4,356,644 A | 11/1982 | Harkness |
| 4,359,101 A | 11/1982 | Gagnon |
| 4,396,069 A | 8/1983 | Ferber et al. |
| 4,679,634 A | 7/1987 | Bulmahn |
| 4,693,331 A | 9/1987 | Johnson et al. |
| 4,700,785 A | 10/1987 | Bartusek et al. |
| 4,724,910 A | 2/1988 | Wheeler |
| 4,871,026 A | 10/1989 | Bernard |
| 4,930,580 A | 6/1990 | Fuss et al. |
| 5,065,681 A | 11/1991 | Hadley |
| 5,366,024 A | 11/1994 | Payne |
| 5,417,293 A | 5/1995 | Leader |
| 5,685,245 A | 11/1997 | Bassett |
| 5,727,638 A | 3/1998 | Wodrich et al. |
| 5,806,606 A | 9/1998 | Robinson |
| 6,044,916 A | 4/2000 | Hundeby |
| 6,431,287 B1 | 8/2002 | Ramp |
| 6,533,307 B1 | 3/2003 | Singh |
| 6,606,956 B1 | 8/2003 | Paluch |
| 6,701,857 B1 | 3/2004 | Jensen et al. |
| 7,093,380 B2 | 8/2006 | Hubscher et al. |
| 7,743,844 B2 | 6/2010 | Kovach et al. |
| 8,047,299 B2 | 11/2011 | Hurtis |
| 8,275,525 B2 * | 9/2012 | Kowalchuk ............ A01C 7/205 111/200 |
| 8,286,566 B2 | 10/2012 | Schilling et al. |
| 8,555,798 B2 | 10/2013 | Schilling et al. |
| 9,883,621 B2 * | 2/2018 | Keigley ............... A01B 63/008 |
| 2003/0164125 A1 | 9/2003 | Paluch et al. |
| 2008/0011496 A1 | 1/2008 | Garrison et al. |
| 2008/0142233 A1 | 6/2008 | Hurtis et al. |
| 2011/0083867 A1 | 4/2011 | Leith |
| 2011/0120357 A1 | 5/2011 | Schilling et al. |
| 2011/0313572 A1 | 12/2011 | Kowalchuk et al. |
| 2013/0264080 A1 | 10/2013 | Keigley |

* cited by examiner

SOIL WORKING MACHINES INCLUDING HEIGHT AND PITCH TOOL ADJUSTABILITY

CROSS-REFERENCE

The present application is a continuation of U.S. patent application Ser. No. 15/075,461 filed Mar. 21, 2016, which is a continuation of Ser. No. 13/860,367 filed on Apr. 10, 2013, which claims the benefit of and priority to U.S. Application No. 61/622,290 filed Apr. 10, 2012 the disclosures of which are hereby incorporated by reference.

BACKGROUND

Machines and tools for working soil are useful in connection with a variety of endeavors including athletic field maintenance, maintenance of arenas, tracks, and competition courses for horses and other animals, landscaping, runoff and erosion control, installation and maintenance of lawns and seedbeds, grading, and scarification and smoothing of soil among others. While present soil working machines and tools offer a number of benefits, they suffer from significant limitations and shortcomings. Applications such as landscaping, athletic field maintenance, race tracks, equestrian courses, and show rings for horses and other animals may present a number of challenges including the need for a high degree of uniformity and consistency, the need to navigate tight or complex geometries, the need to work unconventional soil compositions or compositions of other media such as engineered or treated soil media used, for example, in equine competition arenas as well as a variety of other engineered, synthetic or augmented media all of which are collectively referred to as soil for the sake of concise description, the need for operator safety and ease of operation. There is a significant heretofore unmet need for the self-propelled soil working machines disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art to which the invention relates.

SUMMARY

Unique self-propelled soil working machines are disclosed. In certain exemplary embodiments the self propelled soil working machine includes a tool carrier which is actively adjustable to provide variable downward force on a soil working tool via a suspension element which is further passively responsive to accommodate motion of the tool in response to external force. In certain exemplary embodiments, the tool carrier is configured to adjust the working depth and pitch of the tool. Further embodiments, forms, objects, features, advantages, aspects, and benefits shall become apparent from the following description and figures.

DETAILED DESCRIPTION

Figure 1:
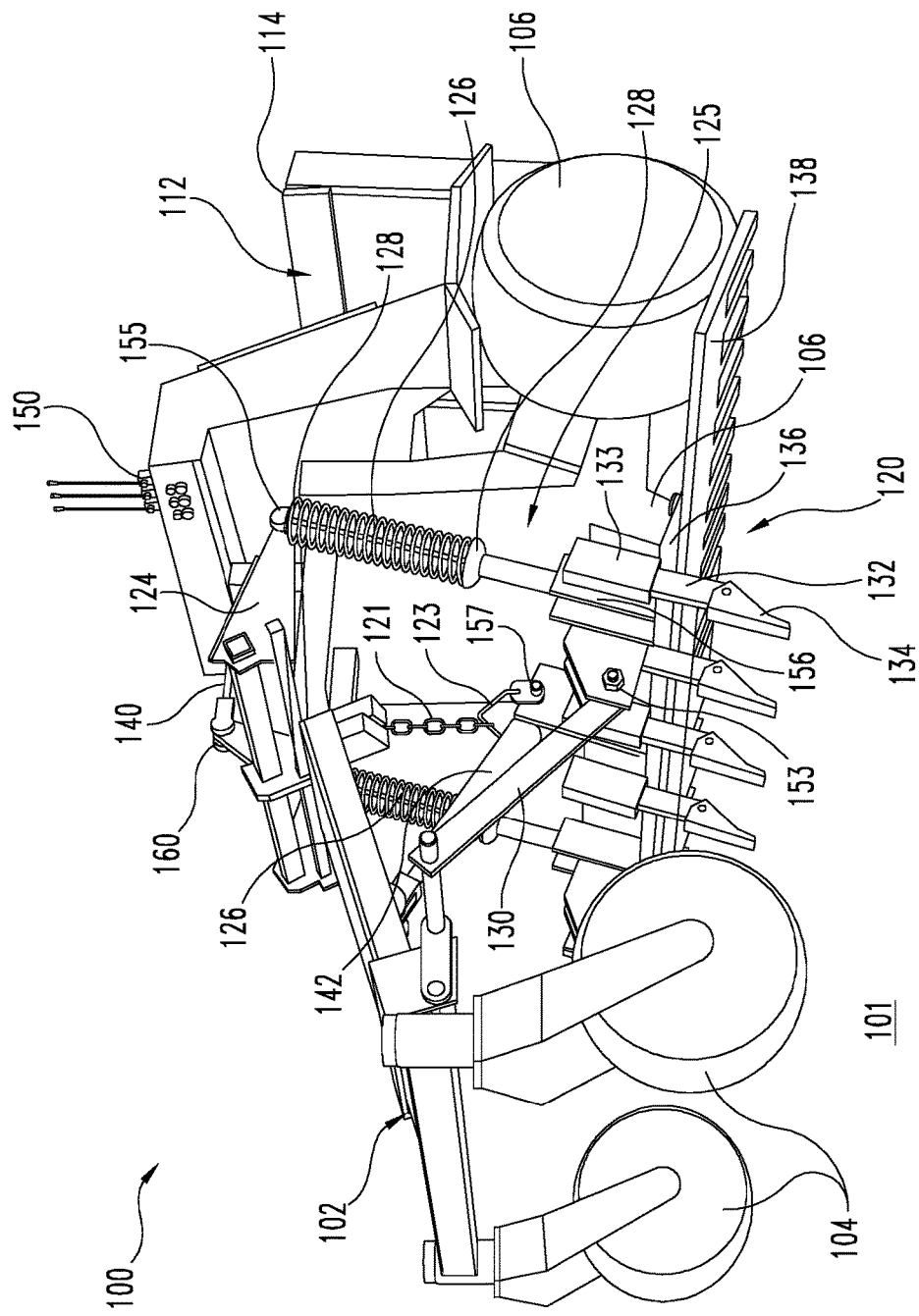
FIG. 1 is a first perspective view of an exemplary self-propelled soil working machine carrying an exemplary soil working tool.
Figure 2:
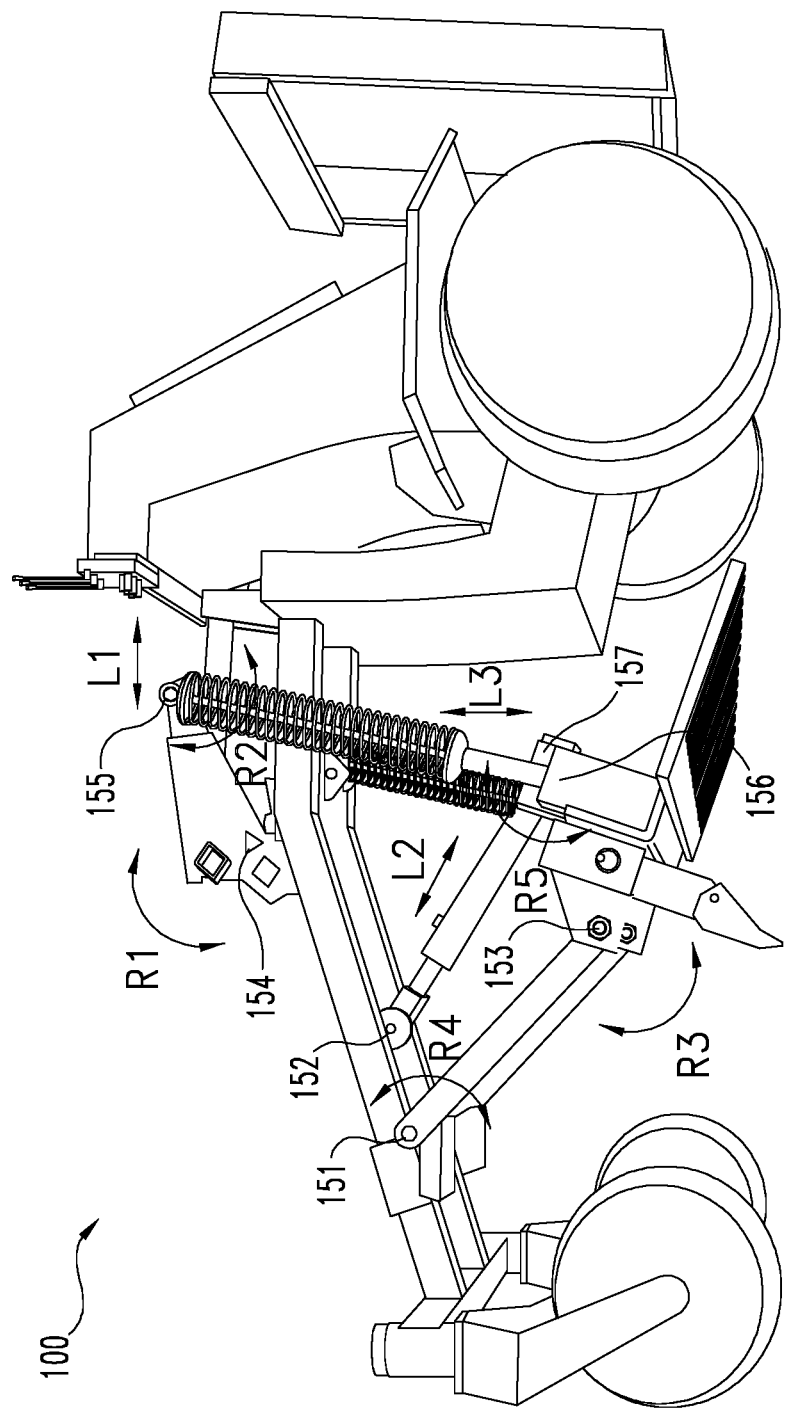
FIG. 2 is a second perspective view of the exemplary self-propelled soil working machine of FIG. 1.

With reference to FIGS. 1-4 there are illustrated several views of an exemplary self-propelled soil working machine 100. Machine 100 includes a chassis 102 supported by front wheels 104 and rear wheels 106 which contact a ground surface 101 and support chassis 102. In the illustrated embodiments chassis 102 is configured as a frame based chassis. It shall be appreciated, however, that other embodiments comprise a partial frame chassis, unibody chassis, or other types of chassis or support structures that are configured to be supported by ground contacting wheels or other ground contacting members and coupled with one or more soil working tools.

In the illustrated embodiments front wheels 104 are configured as caster type wheels which preferably are rotatable 360 degrees relative to chassis 102. It shall be appreciated that a variety of differently configured front wheels may be utilized including, for example, front wheels provided on an axle, rack and pinion assembly, or other types of front end steering assembly and/or front end drive assembly. It shall be further appreciated that additional embodiments may include only a single front wheel, a greater number of front wheels, or may include ground surface contacting elements other than wheels, such as treads or tracks. While front wheels 104 are non-driven wheels in the illustrated embodiment, it shall be appreciated that other embodiments comprise one or more driven front wheels configured to provide at least part of the propulsion to the vehicle.

In the illustrated embodiments rear wheels 106 are coupled with a machine prime mover (not visible in the illustrated views). In a preferred embodiment the prime mover comprises an internal combustion engine configured to drive a hydraulic pump flow coupled with a hydraulic drive system configured to provide torque to rear wheels 106. Exemplary hydraulic drive systems may include elements such as high pressure accumulators, low pressure reservoirs, secondary pumps, gearboxes, collectors and/or differentials. In other embodiments the prime mover is configured as an internal combustion engine configured to provide driving torque through an output shaft. In other embodiments the prime mover comprises an electric motor configured to provide output torque. The electric motor may be powered by a battery or other power storage source, by a generator driven by an internal combustion engine or a combination thereof.

In the illustrated embodiments each of rear wheels 106 is independently controllable and drivable in a forward or reverse direction, though other embodiments may comprise different drive wheel arrangements including front wheel drive arrangements, all wheel drive and four wheel drive arrangements, to name several non-limiting examples. Certain embodiments may comprise only a single rear wheel or a greater number of rear wheels or other ground contacting members.

With continuing reference to FIGS. 1-4, chassis 102 supports an operator station 112 which includes a standing platform (not visible in the illustrated views) and a guard rail 114 positioned at the aft end of machine 100 adjacent the standing platform. Controls 150 are positioned to be manipulatable by an operator occupying the operator station in order to control movement or propulsion of the machine 100 as well as the positioning of one or more tools carried by the vehicle as further described hereinbelow.

In the illustrated embodiments machine 100 is configured as a substantially zero-turning radius machine, however it shall be appreciated that in additional embodiments the machine may be configured in a variety of other forms including, for example, a tractor, an ATV, or another type of wheeled or treaded machine. Furthermore, in certain embodiments, the operator station 112 may comprise an operator seat instead of or in addition to a standing platform. In certain embodiments the operator station 112 may be omitted and the machine may be controlled remotely using a separate operator control station in wireless communication with a controller provided on the machine 100 and configured to control movement or propulsion of the machine 100 as well as the positioning of one or more tools carried by the vehicle.

Chassis 102 is configured to support a soil working tool assembly 120. In the illustrated embodiments, soil working tool assembly 120 comprises a finishing comb 138 including a plurality of finishing teeth, and a plurality of scarifying shanks 132 and scarifying tips 134. It shall be appreciated that for clarity of illustration only one of the scarifying shanks 132 and one of the scarifying tips 134 are labeled with reference numerals. Finishing comb 138 is coupled with angle iron 136, for example, by bolting, welding or with other types of connections. It shall be appreciated that angle iron 136 is but one example of a bracket structure to which one or more soil working tools may be coupled and that other embodiments comprise different tool mounting structures, or no tool mounting structures at all with direct tool connection to one or more linkage elements.

Scarifying shanks 132 are coupled with pockets 133 (only one of which is labeled with a reference numeral for clarity of illustration) which are in turn coupled with angle iron 136. These couplings may be provided through a variety of techniques including bolting, welding, connection pins, clamps, or various other techniques. Collectively, the finishing comb 138, angle iron 136, pockets 133, and scarifying shanks 132 and scarifying tips 134 comprise one example of a tool assembly which may be used in connection with machine 100. It shall be appreciated that a variety of other configurations of tool assemblies may also be utilized in connection with machine 100, including those examples described further herein below.

Exemplary elements connecting tool assembly 120 and chassis 102 will now be described. The tool assembly 120 is coupled with a pulling linkage 130 at a pivotal coupling 153 which rotates or pivots generally in the directions indicated by arrow R3. Pulling linkage 130 is coupled with chassis 102 at pivotal coupling 151 which rotates substantially in the directions indicated by arrow R4. Pulling linkage is configured to provide a force vector component to the tool assembly in the forward or reverse directions generally indicated by arrow X-X of the direction legend illustrated in FIGS. 3 and 4 as the machine is propelled forward or backward. A force vector component generally in the direction of arrow Y-Y of the direction legend illustrated in FIGS. 3 and 4 may also be provided, for example, during turning of the machine. Regardless of the particular direction, the pulling linkage provides one or more force vector components providing working force to the tool assembly 120. Furthermore, the rotation permitted by pivotal couplings 151 and 153 accommodates both adjustment of the height and pitch of the tool assembly 120 relative to the plane defined by arrows X-X and Y-Y of the direction legend illustrated in FIGS. 3 and 4.

The tool assembly is further connected to a suspension 125 at pivotal coupling 156. The suspension 125 is in turn connected to a rocker 124 at pivotal coupling 155. Rocker 124 is further coupled with chassis 102 at pivotal coupling 154. Pivotal coupling 156 permits rotation of the tool assembly substantially in the direction indicated by arrow R5. Pivotal coupling 155 permits rotation of the rocker 124 relative to the suspension 125 substantially in the direction indicated by arrow R2. Pivotal coupling 154 permits rotation of the rocker 124 relative to the chassis 102 substantially in the direction indicated by arrow R1.

In the illustrated embodiments the suspension 125 is configured as a pair of telescoping cylinders in combination with springs 126 which are compressible between spring mounts 128 through relative motion of the telescoping cylinders. It shall be appreciated that a variety of other suspensions may be utilized in various embodiments in addition to or instead of the illustrated configuration including shock absorbers, elastomeric suspension elements, compressible members, pneumatic suspension elements, hydraulic suspension elements, other spring arrangements and combinations of the foregoing and/or other suspension elements. It shall be further appreciated that a variety of spring mounts may be utilized. In the illustrated embodiments spring mounts 128 are crimped or compressed in place relative to respective shafts or cylinders of a telescoping assembly. In certain embodiments the spring mounts may alternatively or additionally be welded, bonded, bolted or otherwise fixedly coupled with respective suspension elements. Certain embodiments comprise spring mounts adjustably coupled with respective suspension elements, for example, through an axial threaded connection which may utilize one or more lock nuts or other locking members, or by a set screw, pin or bolt.

The tool assembly is further coupled with an actuator 142 at pivotal coupling 157. Actuator 142 is coupled with chassis 102 at pivotal coupling 152. In the illustrated embodiments actuator 142 is configured as a hydraulic cylinder which is laterally displaceable in the directions indicated by arrow L2. The operator controls 150 may be configured to control the supply of pressurized hydraulic fluid to actuator 142 to control its position. The tool assembly is connected to the rocker assembly by a chain 121 via a V-bracket 123. The rocker 124 is coupled with an actuator 140 at pivotal coupling 160. Actuator 140 is coupled with the chassis 102 at a further pivotal coupling (not illustrated). In the illustrated embodiments actuator 140 is configured as a hydraulic cylinder which may be controlled in the same or similar fashion as actuator 142. It shall be appreciated that either or both of actuators 140 and 142 may be provided in different configurations, for example, as ratchets, top links or other actuators configured to provide appropriate displacement and force. It shall further be appreciated that either or both of actuators 140 and 142 may be omitted in certain embodiments. In such embodiments vertical adjustment of a tool assembly is preferably, though not necessarily, provided by actuators configured to adjust other structural elements of a machine, for example, adjustable wheel suspension elements configured to raise or lower a chassis, frame or other structure supporting, directly or indirectly a tool assembly, or via a variety of other actuators.

In the illustrated embodiments actuator 140 is selectably controllable to expand and contract in the direction generally indicated by arrow L1 effective to cause rocker 124 to rotate about pivotal coupling 154 in the direction generally indicated by arrow R1. Rotation of the rocker 124 is effective to raise and lower the tool assembly 120 with the chain 121 over a first predetermined range from a maximum height to the point at which the tool assembly 102 contacts the ground surface 101 underlying the machine 100. At this point the further rotation of the rocker 124 is effective to vary the amount of downward force applied to the tool assembly 120 by varying the compression of springs 126. The suspension 125 further accommodates movement of the tool assembly in response to external force applied thereto, for example, if the tool assembly contacts an obstruction such as a rock or other structure located in a soil medium being worked.

It shall be appreciated that chain 121 is one example of a weight lifting structure that may be utilized to raise and lower a soil working tool or tool assembly. Structures such as cables, jointed linkages and other structures that limit relative displacement of a tool relative to a support structure to allow lifting through actuation in one direction, and deform, bend, flex, move or otherwise accommodate movement Actuator 142 is selectably controllable to expand and contract in the direction generally indicated by arrow L2 effective to cause tool assembly 120 to rotate about pivotal coupling 153 in the direction generally indicated by arrow R3. In this manner the pitch of the tool assembly to the plane defined by arrows X-X and Y-Y of the direction legend illustrated in FIGS. 3 and 4 may be varied.

Figure 3:
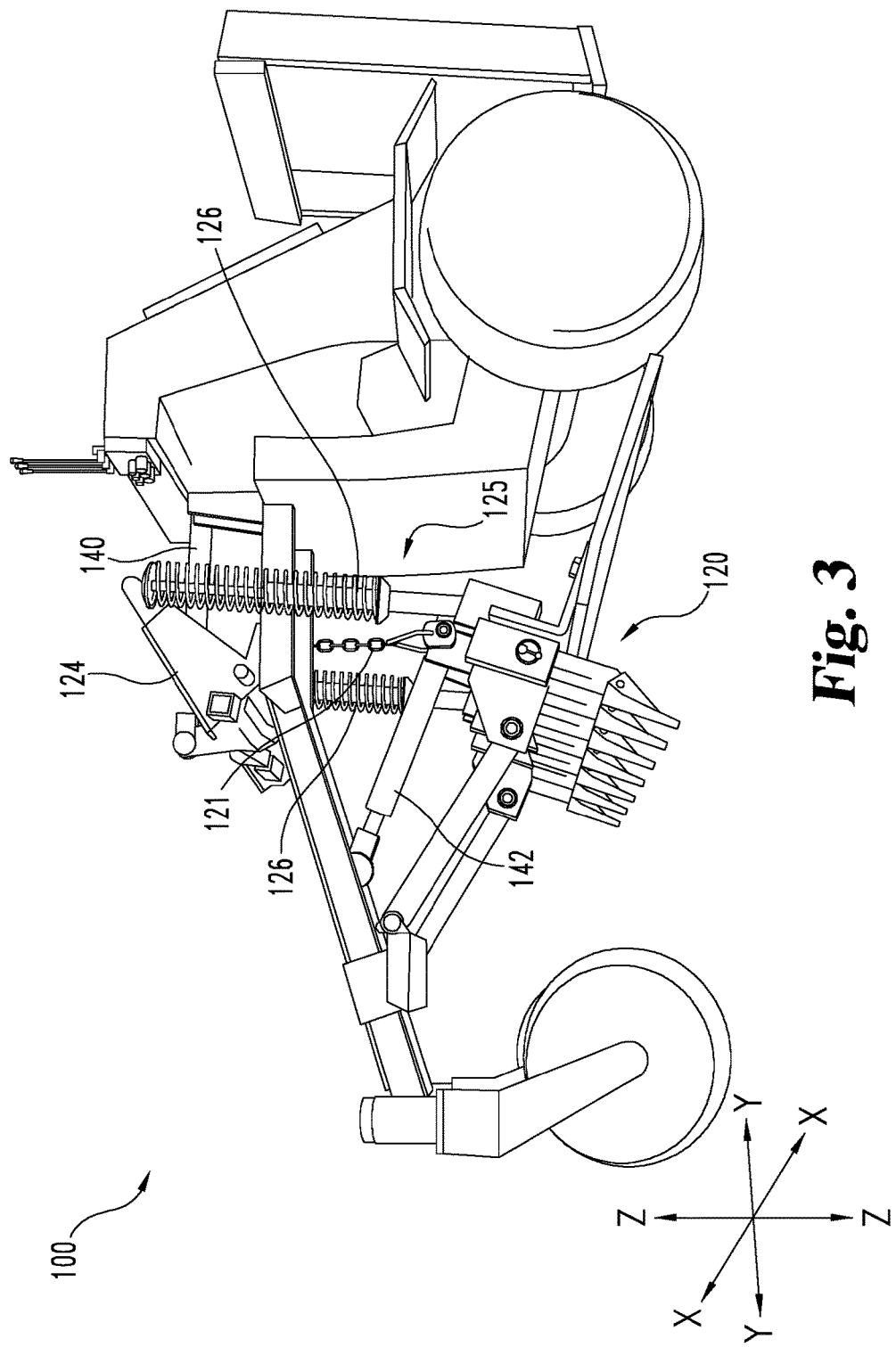
FIG. 3 is third perspective view of the exemplary self-propelled soil working machine of FIG. 1 with the soil working tool in a raised position.

With reference to FIG. 3 there is illustrated the machine 100 with the tool assembly 120 configured in a raised position along vertical axis Z-Z. Rocker 124 is rotated upward or counterclockwise relative to FIG. 4 (described below) effective to lift the tool assembly 120 with chain 121. In this position, the spring 126 of suspension 125 will apply a fixed force to the tool assembly, which could be substantially zero force or a predetermined preload force. The preload force may be adjusted by varying the length of the chain 121 to preload springs 126 by a desired amount or additionally or alternatively by setting the position of spring mounts 128 and/or their respective supporting structures either at the time of assembly or through adjustment mechanisms provided in certain embodiments. From the configuration illustrated in FIG. 3, rocker 124 may be counterclockwise to further raise the tool assembly 120 or clockwise to lower the tool assembly 120. Once the tool assembly contacts a surface or structure underlying the machine, further clockwise rotation may be applied to vary the downward force vector component by compressing the springs 126 of the suspension to increase this force, or expanding them to decrease this force.

Figure 4:
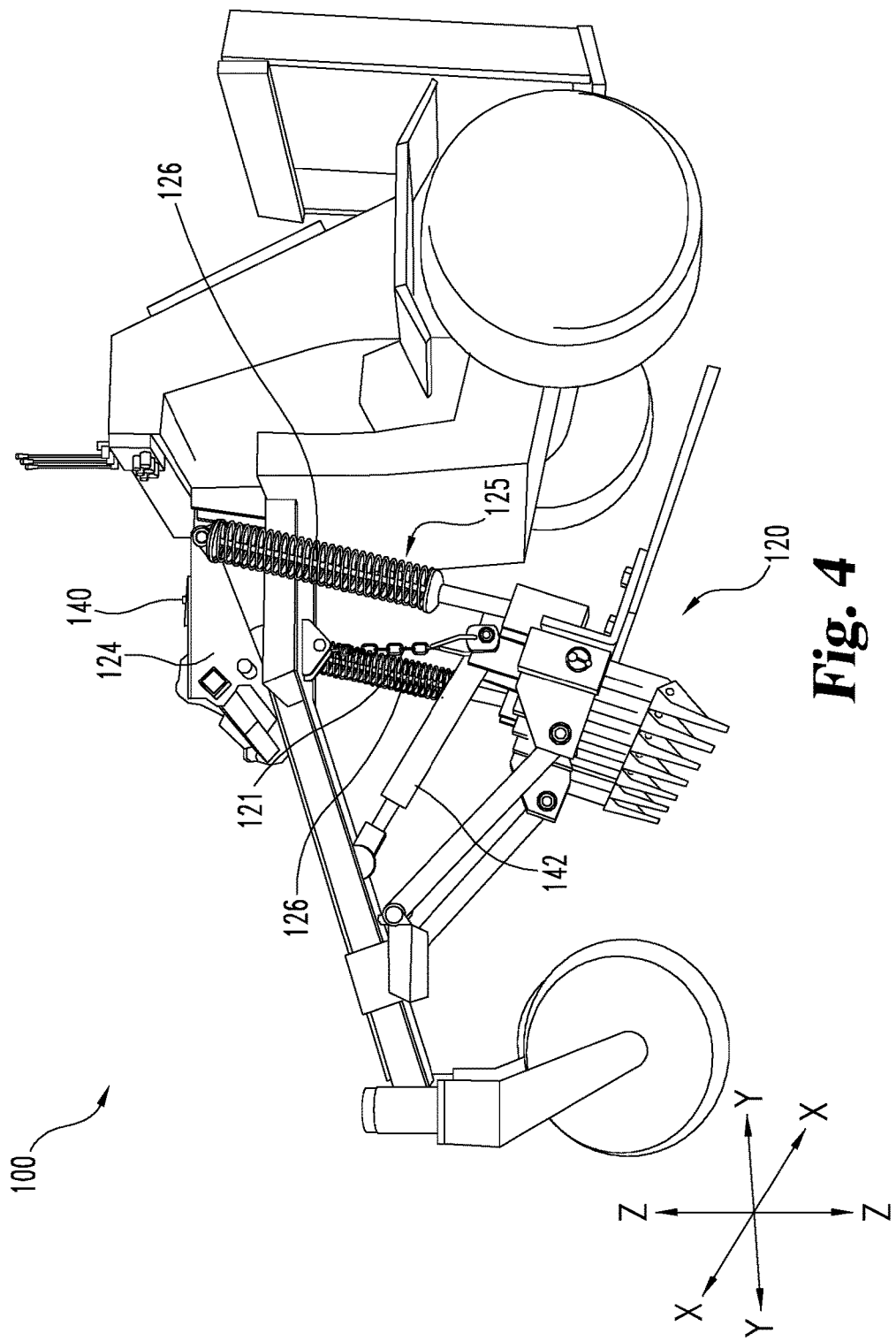
FIG. 4 is fourth perspective view of the exemplary self-propelled soil working machine of FIG. 1 with the soil working tool in a lowered position contacting the ground.

With reference to FIG. 4 there is illustrated the machine 100 configured with the tool assembly 120 in a lowered position along vertical axis Z-Z. In the configuration of FIG. 4, the tool assembly 120 has been lowered to the point of contacting the ground, but the springs 126 remain in the same state as discussed above in connection with FIG. 3, either with substantially zero compression or a desired amount of preload. Rocker 124 is rotated downward or clockwise relative to FIG. 3 effective to lower the tool assembly 120 with chain 121. In this position, the spring 126 of suspension 125 will upon initial contact with the ground surface 101 apply a relatively small, initial magnitude or a substantially zero initial magnitude of downward force vector component to the tool assembly. The magnitude of the downward force vector component may be increased by further rotation of rocker 124 as described below in connection with FIG. 5. Simultaneously the suspension 125 may accommodate passive movement of the tool assembly 120 in combination with the active adjustment of force.

Figure 5:
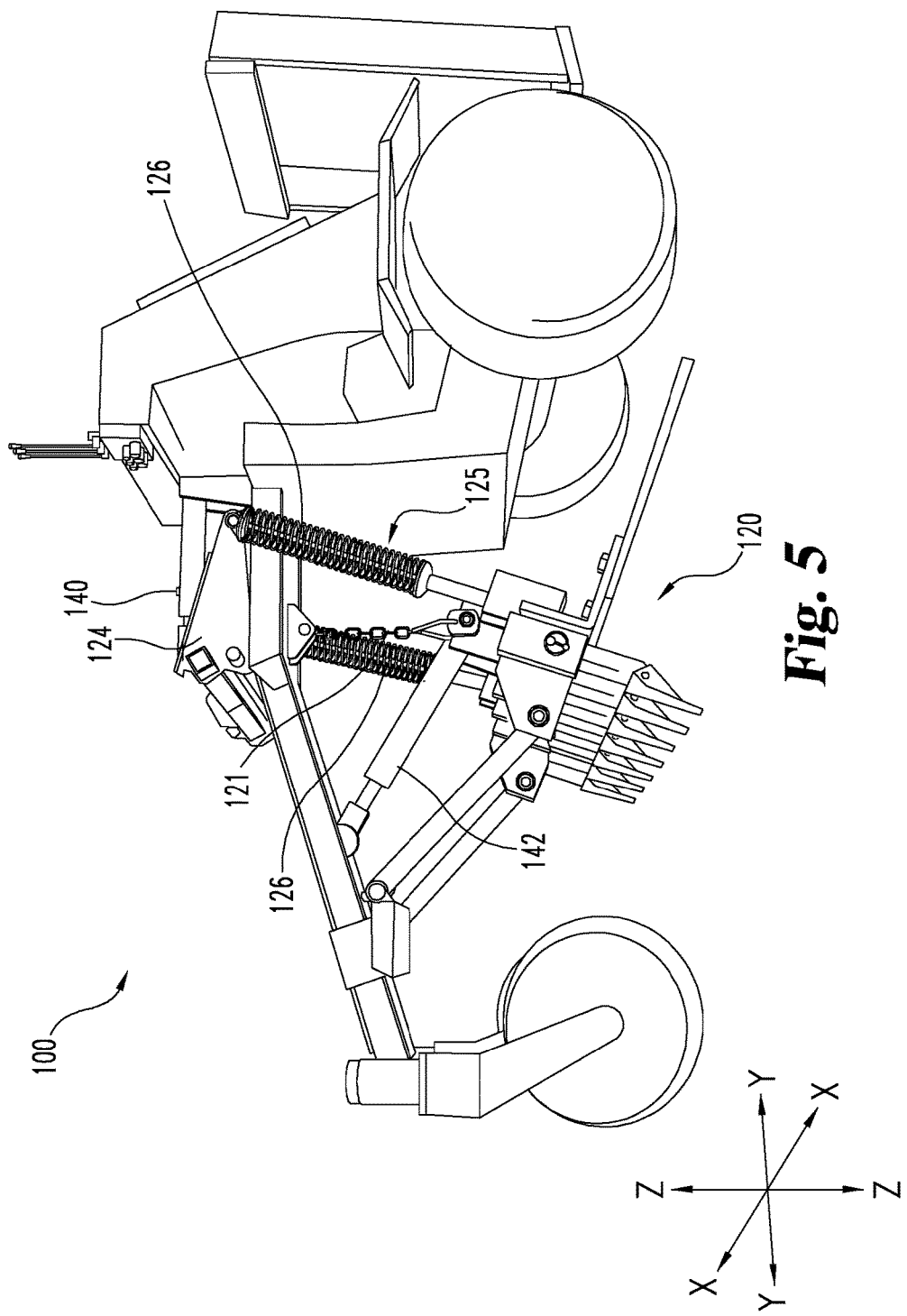
FIG. 5 is fifth perspective view of the exemplary self-propelled soil working machine of FIG. 1 with the soil working tool in a lowered position contacting the ground and the springs compressed.

With reference to FIG. 5 there is illustrated the machine 100 configured with the tool assembly 120 in a lowered position along vertical axis Z-Z. In the configuration of FIG. 4, the tool assembly 120 has been lowered to the point of contacting the ground and the springs 126 remain have been compressed by further rotation of the rocker relative to FIG. 4. Rocker 124 is rotated downward or clockwise relative to FIG. 4 effective to compress the springs 126. In this position, the spring 126 of suspension 125 will apply an adjustable downward force vector component to the tool assembly. The magnitude of the downward force vector component may be increased by further clockwise rotation of rocker 124 or decreased by further counterclockwise rotation of rocker 124. Simultaneously the suspension 125 may accommodate passive movement of the tool assembly 120 in combination with the active adjustment of force.

Figure 6:
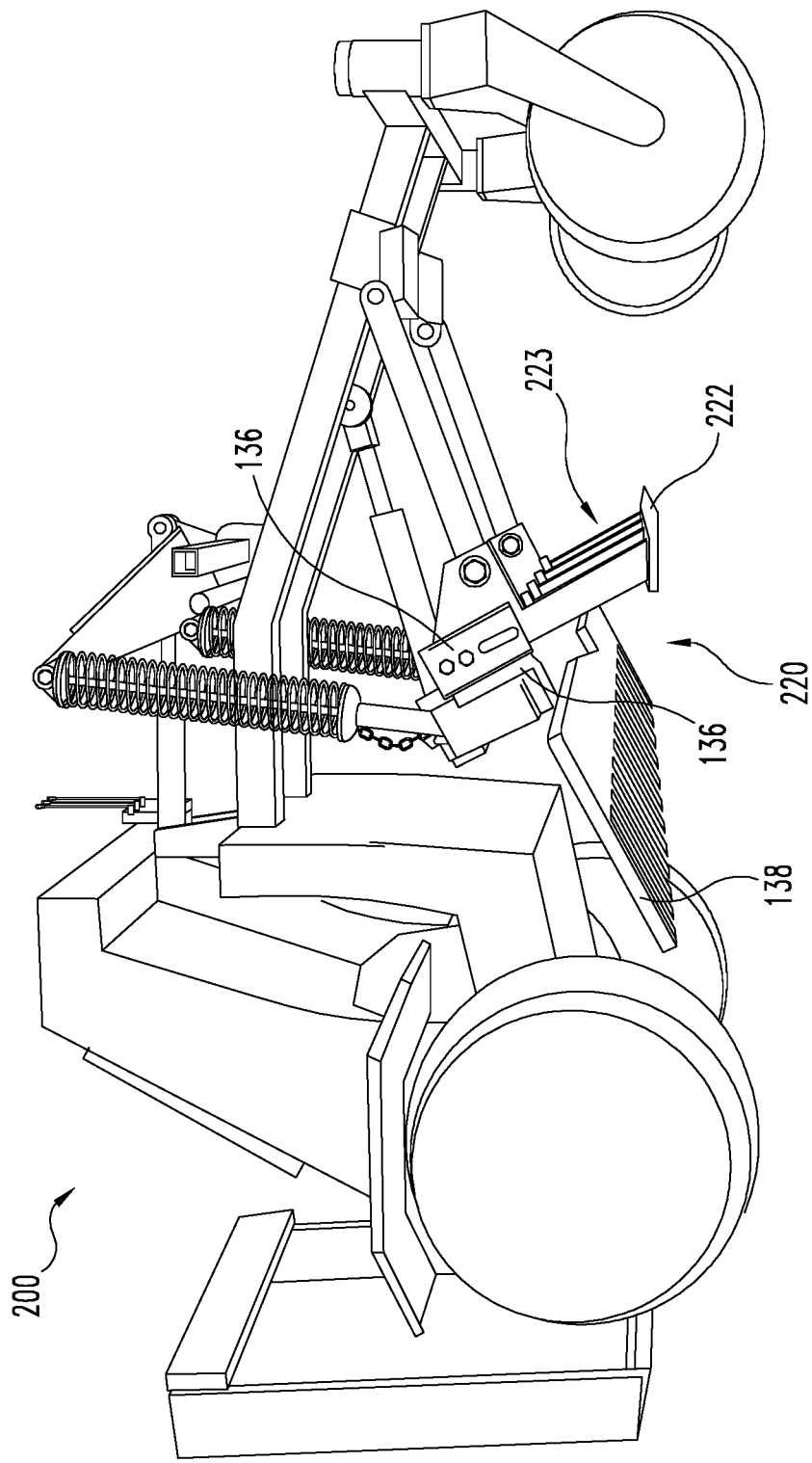
FIG. 6 is a perspective view of an exemplary self-propelled soil working machine carrying a second exemplary soil working tool.

With reference to FIG. 6 there is illustrated an additional exemplary self-propelled soil working machine 200 coupled with a second exemplary soil working tool assembly 220. In the illustrated embodiment machine 200 includes substantially the same features as machine 100 described in connection with FIGS. 1-5 above with the exception of tool assembly 220. For the sake of brevity and clarity of illustration the corresponding elements of machine 200 have not all been numbered. Tool assembly 220 includes finishing comb 138 and pockets 133 coupled with angle iron 136, and further includes profile blade 222 which includes a plurality of support struts 223 received by and coupled with respective pockets 133. Further details of profile blade 222 are described in U.S. patent application Ser. No. 13/158,760 filed Jun. 13, 2011, the disclosure of which is hereby incorporated by reference.

It shall be appreciated that tool assemblies 120 and 220 are but two examples of tool assemblies including soil working tools which may be coupled with and carried by the exemplary soil working machines disclosed herein. Further examples of such tool assemblies include leveling blades, rolling baskets, rock teeth, hydraulic rippers, grooming rods, pin or post arrays, brushes, brooms, and finishing mats to name several non-limiting examples. Further details and examples of soil working tools and tool assemblies which may be coupled with and carried by the exemplary soil working machines disclosed herein include those disclosed in the above referenced U.S. patent application Ser. No. 13/158,760, and U.S. Pat. Nos. 7,540,331, 7,478,682, 7,066,275, 7,055,698, 6,739,404, and 5,806,605, and U.S. Reissued Pat. No. RE39889 E. The aforementioned patents and applications are hereby incorporated by reference.

Additional aspects according to a number of exemplary embodiments will now be described. Certain exemplary embodiments include apparatuses comprising a self-propelled soil working machine including a frame and an operator station, front and rear ground supporting wheels coupled with the frame with a least one of the front and rear wheels configured to propel the machine, a linkage coupled with the frame and coupled with a soil working tool, the soil working tool being adjustably positioned by the linkage rearward of the front wheels and forward of the rear wheels, the linkage including a suspension element accommodating movement of the tool in response to external force, and an adjustment mechanism coupled with the linkage and configured to adjust the linkage effective to emulate the addition or subtraction of weight exerting downward force on the tool.

In certain forms the linkage further comprises a lifting element coupled with and extending between the tool and the frame, the lifting element configured to selectably raise and lower the tool and to limit movement of the tool relative to the suspension element in a first direction.

In certain forms the linkage further comprises a rocker pivotally coupled with the frame at a first connection, pivotally coupled with the adjustment mechanism at a second connection, and pivotally connected with the suspension element at a third connection.

In certain forms the lifting element comprises a chain, a cable, or a jointed assembly coupled with and extending between the rocker and the tool.

In certain forms the suspension element comprises a first member, a second member displaceable relative to the first member, and a spring coupled with the first member and the second member.

In certain forms the adjustment mechanism comprises an actuator configured to provide positive and negative vertical movement of the tool via the linkage.

In certain forms the actuator comprises a hydraulic actuator, a ratchet, or a top link.

In certain forms the linkage comprises a plurality of suspension elements.

In certain forms the plurality of suspension elements are pivotally coupled at respective first ends with the tool and pivotally coupled at respective second ends with a rocker, the rocker being pivotally coupled with the frame.

In certain forms the linkage comprises a three point connection element rotatably coupled with the frame, the linkage, and the actuator.

Certain forms further comprise tool position controls configured to be manipulatable by an operator from the operator station.

Certain forms further comprise a second adjustment mechanism configured to vary pitch of the tool.

In certain forms the second adjustment mechanism comprises a second actuator pivotally coupled with and extending between the frame and the tool.

In certain forms the machine is a substantially zero turning radius machine or a tractor. In certain forms the operator station comprises a standing platform.

Certain exemplary embodiments include self-propelled soil working machines comprising a plurality of surface contact wheels carrying a chassis, a carrier assembly coupled with the chassis, the carrier assembly including a suspension coupled with the chassis and a soil working tool coupled with the suspension, an adjustment mechanism coupled with the carrier assembly and configured to adjust the position of the tool and to vary force applied to the tool at least in part based upon compression of the suspension.

In certain forms the carrier assembly comprises a rocker rotatably coupled with the chassis, the suspension, and the adjustment mechanism at respective first, second, and third couplings.

In certain forms the suspension comprises a first spring assembly, a second spring assembly, and a weight bearing coupling member rotatably coupled with the rocker and the tool.

In certain forms the first spring assembly, the second spring assembly, and the weight bearing coupling member are rotatably coupled with the rocker and the tool by separate couplings.

In certain forms the suspension comprises a lifting member configured to restrict motion of the tool relative to the suspension in a first direction and not to restrict motion of the tool relative to the suspension in a second direction substantially opposite from the first direction.

In certain forms the chassis comprises a frame structure connected with the plurality of surface contact wheels.

In certain forms the chassis comprises a unibody assembly.

Certain forms further comprise an operator station and controls configured to be manipulatable by an operator occupying the operator station to control the adjustment mechanism.

Certain exemplary embodiments include soil working machines comprising a plurality of support members configured to contact a ground surface under the machine, at least one of the ground contacting members being a driven member configured to propel the machine, a tool linkage rotatably coupled with the machine and including a tool mount and at least one compressible member, and an actuator coupled with the tool linkage, wherein the tool actuator may be configured to adjustably position the tool mount in a plurality of positions intermediate the front and the back of machine and to vary a downward force vector component applied to the tool mount.

Certain forms further comprise an operator station coupled with the machine.

In certain forms, the operator station comprises a standing platform, or a seat.

In certain forms, the compressible member comprises a spring.

In certain forms the spring is configured to selectably apply variable force to the tool mount and the actuator is configured to vary said force.

In certain forms the actuator is configured to vary said force in accordance with Hooke's law.

In certain forms the tool linkage is configured in a belly mount configuration relative to the machine.

Certain forms further comprise a soil working tool coupled with the tool mount.

In certain forms the actuator is configured to raise and lower the tool.

In certain forms the actuator is configured to compress the compressible member effective to increase force applied to the tool when the tool is in contact with the ground surface under the machine.

In certain forms the actuator is configured to compress the compressible member effective to increase force applied to the tool only when the tool is in contact with the ground surface under the machine.

In certain forms the compressible member is configured to apply a pre-load force to the tool when the tool is not in contact with the ground surface under the machine.

In certain forms the pre-load force is variable by adjusting the length of a weight lifting linkage coupled with and extending between the tool and the machine.

It shall be understood that the exemplary embodiments summarized and described in detail above and illustrated in the figures are illustrative and not limiting or restrictive. Only the presently preferred embodiments have been shown and described and all changes and modifications that come within the scope of the invention are to be protected. It shall be appreciated that the embodiments and forms described below may be combined in certain instances and may be exclusive of one another in other instances. Likewise, it shall be appreciated that the embodiments and forms described below may or may not be combined with other aspects and features disclosed elsewhere herein. It should be understood that various features and aspects of the embodiments described above may not be necessary and embodiments lacking the same are also protected. As utilized herein, the term substantially is used to indicate that an acceptable margin or degree of variance or error falls within the literal scope of a precise term as would occur to one of ordinary skill in the art depending on the particular embodiment or application in question. Unless otherwise limited the terms connected, connector, coupling and coupled refer to and encompass any direct or indirect coupling, connection, attachment. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
   a soil working machine including a frame and an operator station;
   front and rear ground supporting members coupled with the frame;
   a linkage coupled with the frame and coupled with a soil working tool, the soil working tool being adjustably positioned by the linkage rearward of the front members and forward of the rear members, the linkage including a suspension element accommodating movement of the tool in response to external force;
   a first adjustment mechanism coupled with the linkage and configured to adjust the linkage; and
   a second adjustment mechanism coupled with the soil working tool and configured to adjust the soil working tool;
   wherein adjustment of the first adjustment mechanism emulates the addition or subtraction of weight exerting downward force on the tool, adjustment of the second adjustment mechanism varies the pitch of the tool, the first adjustment mechanism and the second adjustment mechanism can be adjusted to vary an amount of emulated weight exerting downward force on the tool with the tool at first predetermined pitch and can be adjusted to vary the first predetermined pitch of the tool with emulation of a first predetermined amount of weight exerting downward force on the tool.

2. The apparatus of claim 1 wherein the linkage further comprises a lifting element coupled with and extending between the tool and the frame, the lifting element configured to selectably raise and lower the tool and to limit movement of the tool relative to the suspension element in a first direction.

3. The apparatus of claim 2 wherein the linkage further comprises a rocker pivotally coupled with the frame at a first connection, pivotally coupled with the first adjustment mechanism at a second connection, and pivotally connected with the suspension element at a third connection.

4. The apparatus according to claim 3 wherein the lifting element comprises a chain, a cable, or a jointed assembly coupled with and extending between the rocker and the tool.

5. The apparatus of claim 1 wherein the suspension element comprises a first member, a second member displaceable relative to the first member, and a spring coupled with the first member and the second member.

6. The apparatus of claim 1 wherein the first adjustment mechanism comprises an actuator configured to provide positive and negative vertical movement of the tool via the linkage.

7. The apparatus of claim 6 wherein the actuator comprises a hydraulic actuator, a ratchet, or a top link.

8. The apparatus of claim 1 wherein the linkage comprises a plurality of suspension elements.

9. The apparatus of claim 8 wherein the plurality of suspension elements are pivotally coupled at respective first ends with the tool and pivotally coupled at respective second ends with a rocker, the rocker being pivotally coupled with the frame.

10. The apparatus of claim 6 wherein the linkage comprises a three point connection element rotatably coupled with the frame, the linkage, and the actuator.

11. The apparatus of claim 1 further comprising tool position controls configured to be manipulatable by an operator from the operator station.

12. The apparatus of claim 1 wherein the second adjustment mechanism comprises a second actuator pivotally coupled with and extending between the frame and the tool.

13. The apparatus according to claim 1 wherein the machine is a substantially zero turning radius machine or a tractor.

14. The apparatus of claim 1 wherein the operator station comprises a standing platform.

15. A soil working machine comprising:
    a plurality of surface contact members carrying a chassis;
    a carrier assembly coupled with the chassis, the carrier assembly including a suspension coupled with the chassis and a soil working tool coupled with the suspension;
    a first adjustment mechanism coupled with the carrier assembly and configured to adjust the position of the soil working tool and to vary force applied to the soil working tool at least in part based upon compression of the suspension; and
    a second adjustment mechanism coupled with the soil working tool and configured to adjust position of the soil working tool;
    wherein the first adjustment mechanism and the second adjustment mechanism can be adjusted concurrently or sequentially to position the tool at a plurality of different pitches with the same force magnitude applied to the soil working tool by the suspension and to position the tool at a the same pitch with the a plurality different force magnitudes applied to the soil working tool by the suspension.

16. The machine according to claim 15 wherein the carrier assembly comprises a rocker rotatably coupled with the chassis, the suspension, and the adjustment mechanism at respective first, second, and third couplings.

17. The machine according to claim 16 wherein the suspension comprises a first spring assembly, a second spring assembly, and a weight bearing coupling member rotatably coupled with the rocker and the tool.

18. The machine according to claim 17 wherein the first spring assembly, the second spring assembly, and the weight bearing coupling member are rotatably coupled with the rocker and the tool by separate couplings.

19. The machine according to claim 15 wherein the suspension comprises a lifting member configured to restrict motion of the tool relative to the suspension in a first direction and not to restrict motion of the tool relative to the suspension in a second direction substantially opposite from the first direction.

\* \* \* \* \*